(12) United States Patent
Tresorier

(10) Patent No.: US 6,371,708 B1
(45) Date of Patent: Apr. 16, 2002

(54) SPREAD RIVET AND METHOD OF PRODUCTION

(75) Inventor: Jean-Francois Tresorier, Pont de Claix (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/867,216

(22) Filed: May 29, 2001

(51) Int. Cl.[7] ............... F16B 21/00; F16B 37/04
(52) U.S. Cl. ............... 411/344; 411/45; 411/61; 470/29
(58) Field of Search ............... 411/45, 46, 48, 411/61, 344, 345; 470/29, 30

(56) References Cited

U.S. PATENT DOCUMENTS 5,195,857 A * 3/1993 Hiramoto ............... 411/344
5,775,861 A * 7/1998 Leon et al. ............... 411/344
5,871,320 A * 2/1999 Kovac ............... 411/344 X
6,074,144 A * 6/2000 Meyer ............... 411/45 X

* cited by examiner

Primary Examiner—Neill Wilson
(74) Attorney, Agent, or Firm—Gifford, Krass, Groh, Sprinkle, Anderson & Citkowski, P.C.

(57) ABSTRACT

The expansion rivet consists of an expansion peg and a drive-in pin, which in the preassembled state of the expansion rivet are captively joined together. In its midsection, the expansion peg has an insertion hole adapted to the form of the drive-in pin, two lateral engagement wings projecting in opposite directions and two opposing spreader legs projecting downward at right angles. The preassembled drive-in pin protrudes slightly out of the expansion peg but is in engagement with the two spreader legs. When the drive-in pin is driven into the expansion peg, the spreader legs are forced apart by the drive-in pin to form a riveted connection.

25 Claims, 2 Drawing Sheets

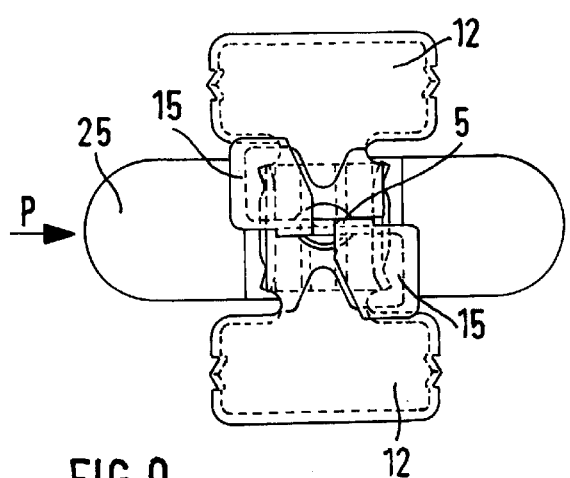
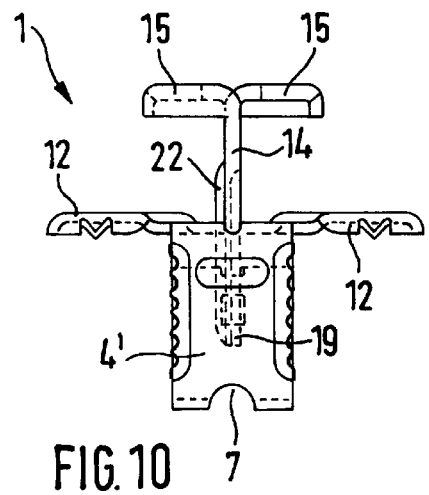
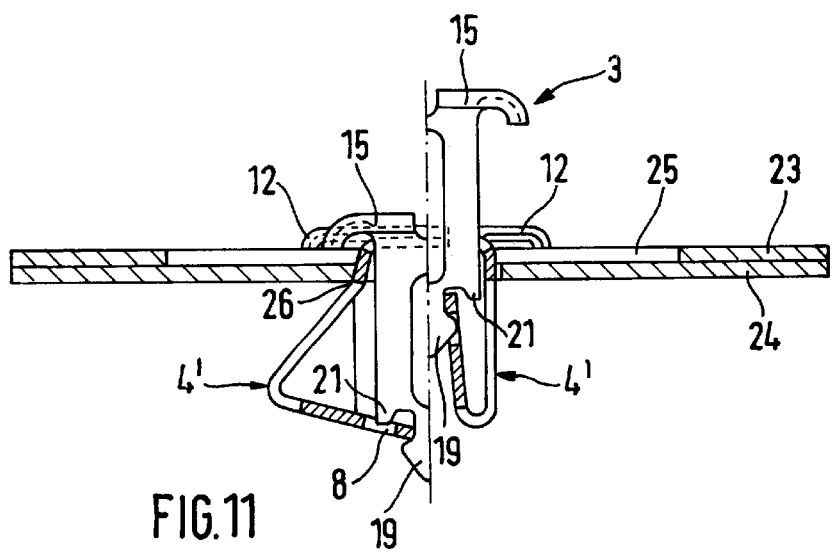
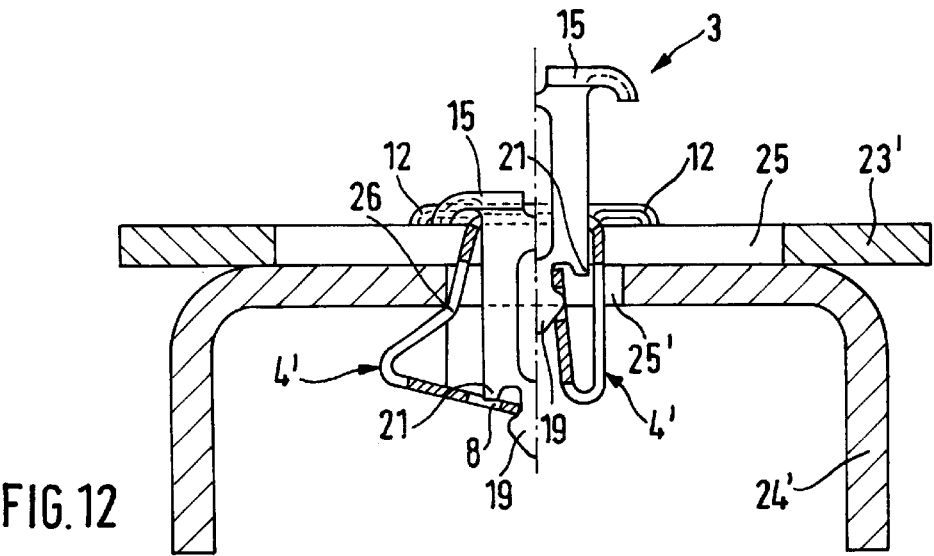

SPREAD RIVET AND METHOD OF PRODUCTION

BACKGROUND

This invention relates generally to rivets, and more specifically to a spread rivet and a method for producing the same.

Rivets provide an inseparable connection of work pieces or component parts and can, where a separable connection is not required or is even undesirable, replace connection by means of bolts, washers and nuts. Ordinary rivets consist of a pin with set-head and rivet shaft. For riveting, the rivet shaft is inserted through a rivet hole stamped or drilled in advance in the parts to be joined together. The rivet is held in place on the existing set-head by means of a tool serving as a hold-on and the free end of the shaft is formed into a locking head using pressure or impact force. This type of riveting can be used only at riveting points accessible from both sides.

For connection points accessible from one side only, blind rivets are frequently used. These consist of a hollow rivet, which is penetrated from a locking head side by a rivet stud, with the rivet head on the rivet shaft of the hollow rivet and with a mandrel protruding out on the set-head side. The mandrel is joined to the rivet stud at a predetermined breaking point. For riveting, the blind rivet is inserted into the rivet hole with the locking head side first, until the set-head of the hollow rivet is in place. Then with a strong pull on the mandrel, the rivet stud is drawn into the hollow rivet so that the rivet shaft expands and is deformed to provide the locking head. The mandrel is broken off at its predetermined breaking point. The tensile force required for the riveting action can be applied only with a power tool that is often pneumatically or hydraulically driven. The waste from the ruptured mandrel and its removal is a disadvantage of this type of rivet.

These rivets are each suitable only for certain rivet holes, and the hole shape and size of the rivet shaft must be matched in order to ensure a secure union. The length of the rivet shaft must be matched to the thickness of the parts to be joined. Therefore, numerous rivet sizes and rivet forms are necessary for different uses.

Thus, there is a need in the art for a spread rivet, especially of metal, that is universally applicable and can be easily and simply seated. It should automatically adjust to different rivet hole shapes and variable fastening thicknesses of the parts to be joined.

SUMMARY OF THE INVENTION

Accordingly, the present invention is a spread rivet consisting of two parts, namely an expansion peg and a drive-in pin, which in the preassembled state of the expansion rivet are captively joined together. The expansion peg has an insertion hole in the middle that is adapted to the form of the drive-in pin, two lateral engagement wings projecting in opposite directions and two opposing spreader legs projecting downward at right angles. The drive-in pin, inserted into the insertion hole in the preinstallation, protrudes out of the expansion peg to a certain extent but is in engagement with the two spreader legs. As the drive-in pin is driven into the expansion peg, the spreader legs are spread apart by the drive-in pin.

This expansion rivet, once it has been inserted into the prepared rivet holes of two component parts to be joined together, can be seated in a simple manner and without special tools merely with a hammer blow on the drive-in pin; it is particularly employable where rivet holes are accessible from one side only. When the spreader legs are spread apart by seating of the drive-in pin, they can bend over at any level depending upon the thickness of the parts to be joined together. It can therefore adjust to rivet holes of variable size and shape and to component parts of variable thickness, so that the expansion rivet need be produced in only a few different sizes.

According to one preferential embodiment of the invention, the insertion hole (for the pin) is a longitudinal hole and the drive-in pin consists of a plate that has on one end two oppositely directed wings bent at right angles and separated from each other by a slit, and on its other end has a tip, offset by steps, which engages with the spreader legs of the expansion peg when the drive-in pin is seated in the longitudinal hole. The expansion peg and the drive-in pin are preassembled and captively joined together, whereby handling of the expansion rivet is greatly simplified.

The drive-in pin preferably has a medial reinforcement rib extending to or near the tip, and the longitudinal hole running along the expansion peg between the spreader legs is provided on both sides in its midsection, with wider portions matching the reinforcement rib. This ensures a good guide for the drive-in pin in both the preassembly and the riveting action.

Preferably, the spreader legs of the expansion peg have a strip-like form and their free ends are bent back inwardly, such that following preassembly, the steps of the drive-in pin rest on the end edges of the spreader legs.

The spreader legs can have a medial recess in their end edges, within which the steps of the drive-in pin then securely rest following the preassembly.

When shoulder tips are formed on the steps of the drive-in pin as extensions of the outer edges, inadvertent slipping of the spreader legs from the steps is prevented.

According to the preferred embodiment of the invention, the spreader legs have, near their end edges, a medial hole, that is preferably rectangular, in which the drive-in pin engages with ears formed on both sides of its triangular tip, upon preassembly. Thus, the expansion peg and the drive-in pin are captively joined together.

The spreader legs can have toothing along a side edge, which improves seating of the expansion rivet in the rivet hole of the component parts to be joined together.

Following the riveting action, i.e., following seating of the drive-in pin, the wings of the latter rest on the supporting wings of the expansion peg, and these rest on one of the component parts to be joined together. With their end edges and, respectively, the steps provided, the expanded spreader legs engage behind the ears formed at the tip of the drive-in pin and the shoulder tip formed on the steps engage in the hole in the spreader legs. In this manner, the spreader legs are held in their spread position and the joining together of the component parts is ensured.

A method according to the invention for producing such a spread rivet includes the steps of joining a strip with support wings projecting medially at right angles on both sides to the strip by a short and relatively narrow web stamped from a metal band. The method also includes the steps of stamping a longitudinal hole running in the longitudinal direction of the strip, two equally spaced round holes, and also two equally spaced, preferably rectangular, holes in the middle of the strip. The method still also includes the steps of forming the expansion peg by bending the free ends of the strip back about 180° at the middle of the round holes, and two spreader legs by bending the strip uniformly, and at a relatively short distance from the longitudinal hole. The method further includes the steps of stamping from a metal band a key-shaped plate with two mirror-image wings on one end and separated by a slit, and on the other end a triangular tip with offset steps and ears projecting on both sides together with a short neck between the plate and its tip. The method still further includes the steps of forming the drive-in pin by bending these wings at right angles in opposite directions. The method yet further includes the steps of inserting the drive-in pin from above into the medial longitudinal hole of the expansion peg until the ears projecting laterally from the tip engage in the rectangular holes of the spreader legs of the expansion peg and the end edges of the spreader legs come into contact with the steps of the drive-in pin; and the expansion rivet is preassembled.

One advantage of the present invention is that the two parts of the expansion rivet can be simply and cost-efficiently stamped from one metal band in a single processing step and then finally formed and preassembled into the expansion rivet in a few simple bending operations.

Another advantage of the present invention is that shoulder tips extending the side edges of the plate are conveniently left on the steps, so as to engage in the rectangular holes and ensure that the spreader legs rest against the steps.

Still another advantage of the present invention is that the medial recesses stamped in the end edges of the strip further enhance engagement of the side edges with the steps.

Yet another advantage of the present invention is that reinforcement channels or reinforcement ribs formed in the strip between the longitudinal hole and the round holes enhance the stability and the strength of the finished expansion rivet, and the peripheral edges of the engagement wings of the expansion peg and the wings of the drive-in pin can be crimped.

A further advantage of the present invention is that toothing along the side edges of the strip is curved slightly upward between the longitudinal hole and the round holes, to better seat the expansion rivet in the rivet holes of the parts to be joined together.

Still a further advantage of the present invention is that a reinforcement rib running in the longitudinal direction is formed in the plate of the drive-in pin and a longitudinal hole with lateral wider portions matched to these reinforcement ribs is formed in the strip of the expansion peg, so that the drive-in pin is safely guided in both the preassembly and the riveting process.

Other features and advantages of the present invention will be readily appreciated, as the same become better understood after reading the subsequent description taken in conjunction with the accompanying drawings.

BRIEF DESCRIPTION OF THE DRAWINGS

FIG. 9 is a top view of the spread rivet in a rivet hole, according to the present invention;

FIG. 10 is a side view in the direction of the arrow (P) of the spread rivet according to FIG. 9, still in the unseated state;

FIG. 11 is a sectional view taken through two component parts to be joined together illustrating a partially seated spread rivet according to the present invention, and FIG. 12 is a sectional view similar to FIG. 11 with component parts joined together or to be joined together.

DESCRIPTION OF THE PREFERRED EMBODIMENT(S)

The spread rivet 1 consists of two parts, an expansion peg 2 and a drive-in pin 3, which, as will be described more precisely below, are assembled together into the spread rivet 1, as shown in FIG. 10.

Figure 1:
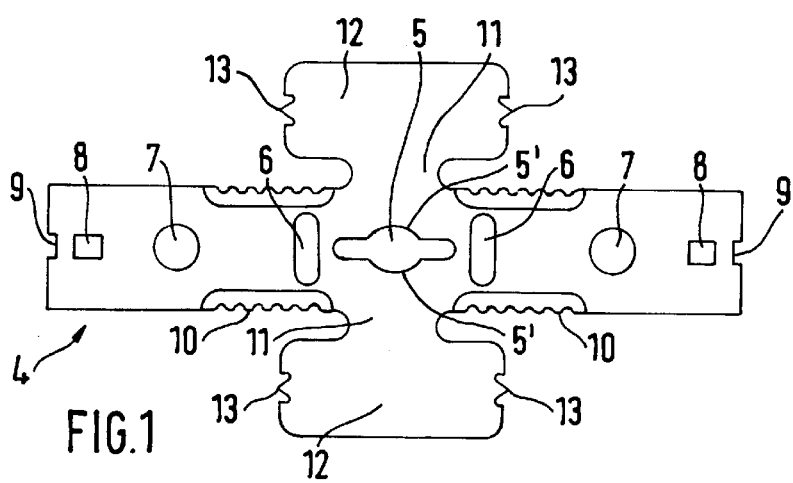
FIG. 1 is an elevational view of a strip for manufacturing an expansion peg for a spread rivet according to the present invention.

FIG. 1 shows a strip 4 used in the manufacture of the expansion peg 2. The strip 4 was stamped out of a metal band and simultaneously perforated and formed as follows. In the middle of the strip 4 and extending in the longitudinal direction of the strip 4, is a longitudinal hole 5, which in turn has wider portions 5' extending outward in the middle. Formed on both sides of the longitudinal hole 5 and running at right angles to the longitudinal extension of the strip 4 are reinforcement channels 6 and, on the midline and uniformly spaced in relation thereto are round holes 7 and, also uniformly spaced in relation to the latter, rectangular holes 8. Also provided in both end edges of the strip 4 are medial recesses 9. The side edges in the area between the longitudinal hole 5 and the round holes 7 are slightly raised and provided with a toothing 10. Extending to both sides from the middle of the strip 4 is a relatively narrow and short web 11, and the two webs 11 widen into mirror-image engagement wings 12. The short sides of these engagement wings 12 are provided with indentations 13. It should be appreciated that the edges of the engagement wings 12 are crimped for stiffening.

Figure 2:
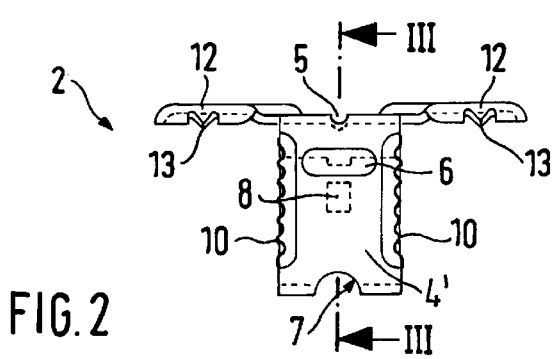
FIG. 2 is a side view of the expansion peg.
Figure 3:
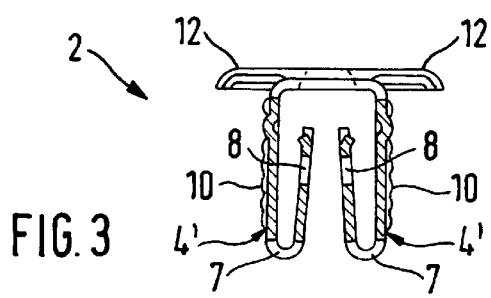
FIG. 3 is a sectional view taken along line III—III in FIG. 2.
Figure 4:
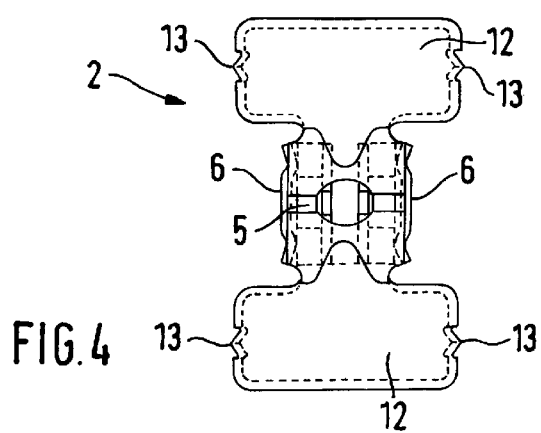
FIG. 4 is a top view of the expansion peg of FIG. 3.

Referring to FIGS. 2–4, in order to form the expansion peg 2, the free ends of the strip 4 are bent back by 180° at the middle of the round holes 7. The strip 4 is once more bent by 90° in the area between the longitudinal hole 5 and the reinforcement channels 6 as shown in FIG. 3 and thus formed into spreader legs 4'.

Figure 5:
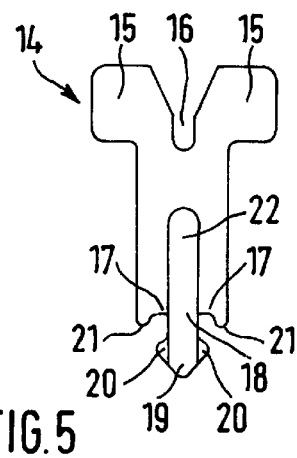
FIG. 5 is a plate used to manufacture a drive-in pin for the spread rivet.
Figure 6:
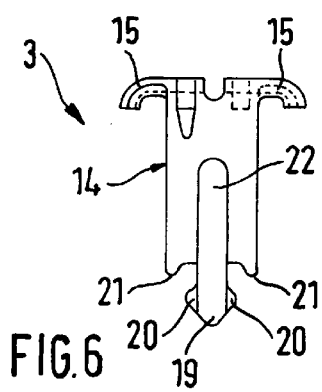
FIG. 6 is a side view of the drive-in pin.
Figure 7:
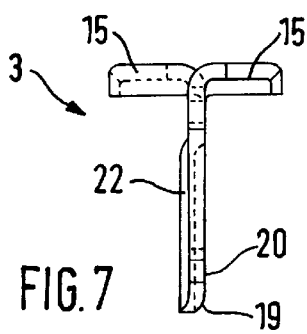
FIG. 7 is another side view of the drive-in pin of FIG. 6.
Figure 8:
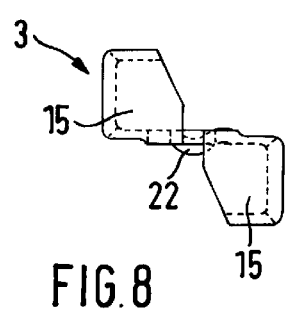
FIG. 8 is a top view of the drive-in pin of FIG. 6.

FIG. 5 shows a plate 14 used to manufacture a drive-in pin 3, as shown in FIGS. 6–8. It is also stamped from a metal band as a narrow, key-shaped plate 14, the width of which corresponds to the length of the longitudinal hole 5 in the expansion peg 2. At its upper end it has two mirror-image wings 15, which are separated by a V-shaped slit 16. Formed at the lower end by steps 17 on both sides is a narrow neck 18, which transitions into a triangular tip 19 with laterally projecting ears 20. Formed on the steps 17 as extensions of the outer edges are two shoulder tips 21. The plate 14 has a medial reinforcement rib 22 running longitudinally and extending into the tip 19, while it is cross-sectionally matched to the wider portions 5' of the longitudinal hole 5.

Referring to FIGS. 6–8, to form the finished drive-in pin 3, the wings 15 are crimped and bent by 90° in opposite directions as shown in FIG. 8.

The expansion peg 2 and the drive-in pin 3 are tempered in a known manner and surface treated. Preferably, the expansion peg 2 and drive-in peg 3, with the help of an automatic assembly machine, is preassembled into the spread rivet 1, as shown in FIG. 10. The drive-in pin 3 is forced into the longitudinal hole 5 of the expansion peg 2, wherein the reinforcement rib 22 fits into the wider portions 5' of the longitudinal hole 5. The drive-in pin 3 is guided by its lateral surfaces and its reinforcement rib 22 into the longitudinal hole 5 and its wider portions 5'. The triangular tip 19, in the area of the recesses 9 on the free ends of the strip 4 formed into the spreader legs 4', forces the spreader legs 4' gently apart until the ears 20 engage in the rectangular holes 8 and the free ends with the recesses 9 come into contact with the steps 17 behind the shoulder tips 21. The expansion peg 2 and the drive-in pin 3 are thus captively joined together, and the spread rivet 1 is preassembled and can be delivered for riveting work.

Referring to FIGS. 9, 10, 11 and 12, the use of the spread rivet 1 for joining together two component parts 23 and 24 and 23' and 24' is illustrated.

In operation, the spread rivet 1 is inserted into the rivet holes 25 or 25' provided therefor in the component parts 23 and 24 or 23' and 24' to be joined together, whereby the engagement wings 12 of the expansion peg 2 come to rest against the upper component part 23 or 23'. Then the union is completed with a simple hammer blow on the wings 15 of the drive-in pin 3. This causes the spreader legs 4' to spread apart and to be retained in this spread position, as is shown in FIGS. 11 and 12.

FIGS. 11 and 12 are medially split and in each case show in the right half the spread rivet 1 inserted into the rivet holes 25 or 25' of the component parts 23 and 24 or 23' and 24' but still not riveted, and in the left half the riveted spread rivet 1. By means of a blow such as from a hammer, the drive-in pin 3 is guided and forced downward into expansion peg 2, causing the spreader legs 4' to be forced apart by the steps 17 and bent outward until the tip 19 slides over the free ends of the spreader legs 4'. The spreader legs lock behind the ears 20 with the recesses 9 and the shoulder tips 21 engaged in the rectangular holes 8 of the spreader legs 4', thus holding the spreader legs 4' in tills spread position. It should be appreciated that depending upon the thickness of the component parts 23, 24 or 23', 24' to be joined together and the width of the rivet holes 25 or 25', the spreader legs 4' may also be angularly bent out or kinked 26 at the edge of the rivet hole 25 of the lower component part 24 or 24', so that a secure union of the two component parts 23, 24 or 23', 24' is achieved.

The described spread rivet 1 can advantageously replace most of the ordinary unions customarily made with bolts, washers and nuts if an inseparable unit is desired. It has all of the advantages and application possibilities of known rivets, also known as plastic spread rivets.

Further, the spread rivets can be used at riveting points accessible from one side only, and can be seated without the use of special tools. There is no waste produced in seating the spread rivets. Advantageously, the spread rivet is adaptable to rivet holes of different size and shape, such as longitudinal holes, round holes, and to different thicknesses of the component parts to be joined together. Also, the spread rivet 1 requires higher dislodgment forces as compared to typical rivets. The spread rivet is made of a metal material and is fire resistant, in comparison with plastic spread rivets. Further, the expansion peg 2 and drive-in pin 3 are preassembled and then joined together to enhance assembly.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A spread rivet for joining work pieces comprising:

a drive-in pin;

an expansion peg having an insertion hole in the middle for receiving the drive-in pin, two lateral engagement wings projecting in opposite directions and two opposing spreader legs projecting downward at right angles;

wherein the spread rivet is preassembled by inserting the drive-in pin into the insertion hole, so that the drive-in pin protrudes slightly out of the expansion peg while in engagement with the two spreader legs, and driving the drive-in pin into the expansion peg forces apart the spreader legs to seat the drive-in pin in the expansion peg.

2. A spread rivet as set forth in claim 1, wherein the expansion peg insertion hole is a longitudinal hole and the drive-in pin is formed from a plate having on one end two oppositely directed wings bent at right angles and separated from each other by a slit, and on an other end a tip, offset by steps, which engages with the spreader legs of the expansion peg as the drive-in pin is seated in the longitudinal hole.

3. A spread rivet as set forth in claim 2, wherein the drive-in pin has a medial reinforcement rib extending towards the tip, and the expansion peg longitudinal hole extends between the spreader legs, with a wider portion of the longitudinal hole corresponding to the reinforcement rib.

4. A spread rivet as set forth in claim 3, wherein the spreader legs of the expansion peg have a free end bent back inwardly, such that after preassembly of the drive-in pin to the expansion peg, the steps of the drive-in pin rest on end edges of the spreader legs.

5. A spread rivet as set forth in claim 4, wherein the spreader legs have a medial recess in an end edge, for the step of the drive-in pin to rest therein as the drive-in pin is seated in the expansion peg.

6. A spread rivet as set forth in claim 5, wherein a shoulder tip is formed on the step of the drive-in pin as an extension of the outer edges.

7. A spread rivet as set forth in claim 4, wherein a shoulder tip is formed on the step of the drive-in pin as an extension of the outer edges.

8. A spread rivet as set forth in claim 3, wherein the spreader legs have a medial, rectangular hole near their end edges, such that the drive-in pin engages with an ear formed on both sides of its triangular tip during preassembly of the drive-in pin to the expansion peg.

9. A spread rivet as set forth in claim 4, wherein the spreader legs have a toothing along a side edge.

10. A spread rivet as set forth in claim 4, wherein the spreader legs include a reinforcement rib.

11. A spread rivet as set forth in claim 8, wherein the drive-in pin is seated in the expansion peg, so that the wings of the drive-in pin rest on the supporting wings of the expansion peg, the end edges of the expansion peg spreader legs engage behind the ear formed on the tip of the drive-in pin, and the shoulder tip formed on the step engages in the rectangular holes in the spreader legs.

12. A method for producing an expansion rivet having an expansion peg and a drive-in peg, said method comprising the steps of:

forming the expansion peg from a strip having support wings projecting medially at right angles on both sides and joined to the strip by a web, and having a longitudinally extending hole, two equally spaced round holes, and two equally spaced rectangular holes in the middle of the strip, by bending a free end of the strip backwardly at the middle of the round holes, and forming two spreader legs by bending the strip near the longitudinal hole;

forming the drive-in pin from a key-shaped plate having two mirror-image wings bent in opposite directions and separated by a slit on one end, and on an other end a triangular tip with offset steps and an ear projecting on both sides and a neck between the plate and its tip; and seating the drive-in pin in the expansion peg by inserting the drive-in pin into the medial longitudinal hole of the expansion peg until the ears projecting laterally from the tip engage in the rectangular hole of the spreader leg of the expansion peg and the end edges of the spreader legs contact the steps of the drive-in pin.

13. A method as set forth in claim 12 including the step of retaining the shoulder tip extending from the side edge of the plate on the step.

14. A method as set forth in claim 12 including the step of stamping medial recesses in an end edge of the strip.

15. A method as set forth in claim 12 including the step of forming a reinforcement channel in the strip between the longitudinal hole and the round holes.

16. A method as set forth in claim 12 including the step of crimping and indenting a peripheral edge of the engagement wing of the expansion peg and the wings of the drive-in pin.

17. A method as set forth in claim 12 including the step of curving the side edges of the strip upwards between the longitudinal hole and the round holes, and forming toothing along the side edges.

18. A method as set forth in claim 12 including the step of forming a longitudinally extending reinforcement rib in the plate of the drive-in pin and forming in the strip for the expansion peg a longitudinal hole with a wider lateral portion corresponding to the reinforcement rib.

19. A method for producing an expansion rivet having an expansion peg and a drive-in peg, said method comprising the steps of:

stamping a strip having support wings projecting medially at right angles on both sides and joined to the strip by a web;

stamping a longitudinally extending hole, two equally spaced round holes, and two equally spaced rectangular holes, in the middle of the strip;

forming the expansion peg by bending a free end of the strip backwardly at the middle of the round holes, and forming two spreader legs by bending the strip near the longitudinal hole;

stamping a key-shaped plate having two mirror-image wings separated by a slit on one end, and on an other end a triangular tip with offset steps and an ear projecting on both sides and a neck between the plate and its tip;

forming the drive-in pin by bending the wings in opposite directions; and inserting the drive-in pin into the medial longitudinal hole of the expansion peg until the ears projecting laterally from the tip engage in the rectangular hole of the spreader leg of the expansion peg and the end edges of the spreader legs come into contact with the steps of the drive-in pin, to preassemble the drive-in pin to the expansion peg.

20. A method as set forth in claim 19 including the step of retaining the shoulder tip extending from the side edge of the plate on the step.

21. A method as set forth in claim 19 including the step of stamping medial recesses in an end edge of the strip.

22. A method as set forth in claim 19 including the step of forming a reinforcement channel in the strip between the longitudinal hole and the round holes.

23. A method as set forth in claim 19 including the step of crimping and indenting a peripheral edge of the engagement wing of the expansion peg and the wings of the drive-in pin.

24. A method as set forth in claim 19 including the step of curving the side edges of the strip slightly upwards between the longitudinal hole and the round holes forming toothing along the side edges.

25. A method as set forth in claim 19 including the step of forming a longitudinally extending reinforcement rib in the plate of the drive-in pin and forming in the strip for the expansion peg a longitudinal hole with a wider lateral portion corresponding to the reinforcement rib.

* * * * *